United States Patent
Lo et al.

(10) Patent No.: US 10,698,137 B2
(45) Date of Patent: Jun. 30, 2020

(54) NEAR-EYE DISPLAY APPARATUS

(71) Applicant: Coretronic Corporation, Hsin-Chu (TW)

(72) Inventors: Hsin-Hsiang Lo, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 158 days.

(21) Appl. No.: 16/127,250

(22) Filed: Sep. 11, 2018

(65) Prior Publication Data
US 2019/0086582 A1 Mar. 21, 2019

(30) Foreign Application Priority Data
Sep. 15, 2017 (CN) .......................... 2017 1 0830603

(51) Int. Cl.
*G02B 3/08* (2006.01)
*G02B 27/01* (2006.01)

(52) U.S. Cl.
CPC ............ *G02B 3/08* (2013.01); *G02B 27/0172* (2013.01); *G02B 2027/011* (2013.01); *G02B 2027/0152* (2013.01)

(58) Field of Classification Search
CPC .................. G02B 3/08; G02B 27/0172; G02B 2027/0152; G02B 2027/011; G02B 27/0101
See application file for complete search history.

(56) References Cited

U.S. PATENT DOCUMENTS 10,359,545 B2 * 7/2019 Smith ................... G02B 3/08
2013/0285885 A1 10/2013 Nowatzyk et al.

FOREIGN PATENT DOCUMENTS

CN  103823305  5/2014

* cited by examiner

*Primary Examiner* — Joseph P Martinez
(74) *Attorney, Agent, or Firm* — JCIPRNET

(57) ABSTRACT

A near-eye display apparatus including a display and a lens element is provided. The display has a light-exiting surface. The lens element is located in front of the light-exiting surface of the display and includes N ring-shaped lens arrays, wherein N is a positive integer greater than 1, and the N ring-shaped lens arrays have a central axis. Each of the N ring-shaped lens arrays includes a plurality of lens units. No step difference exists between any two adjacent lens units in the same ring-shaped lens array. In an i-th ring-shaped lens array, the total number of the lens units is related to a location of at least one of the lens units and related to a pitch of the lens units, and i=1 to N. The near-eye display apparatus has good image quality, is easy to be assembled, and may be formed through a simplified manufacturing process.

10 Claims, 9 Drawing Sheets

NEAR-EYE DISPLAY APPARATUS

CROSS-REFERENCE TO RELATED APPLICATION

This application claims the priority benefit of China application serial no. 201710830603.8, filed on Sep. 15, 2017. The entirety of the above-mentioned patent application is hereby incorporated by reference herein and made a part of this specification.

BACKGROUND OF THE INVENTION

1. Field of the Invention

The invention is related to a display apparatus, in particular, related to a near-eye display apparatus.

2. Description of Related Art

A near-eye display apparatus is a display apparatus using a light field technique and usually includes a display and a XY lens array arranged along an X direction and a Y direction which are orthogonal to each other. The XY lens array is disposed in front of the display so as to transmit a plurality of elemental images on the display to eyes of a user, such that the user can see at a far position (behind the display) an entire virtual image formed by stitching the elemental images. In the near-eye display, the lens array influences image quality of the virtual image, and thus an optical design and manufacture of the lens array and assembly of the lens array and the display are particularly significant.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a near-eye display characterized by good image quality, easy assembly, a simplified manufacturing process, etc.

Other objects and advantages of the invention can be further illustrated by the technical features broadly embodied and described as follows.

To achieve one, some or all of the goals or other goals, an embodiment of the invention provides a near-eye display apparatus including a display and a lens element. The display has a light-exiting surface. The lens element is located in front of the light-exiting surface of the display. The lens element includes N ring-shaped lens arrays, wherein N is a positive integer greater than 1, and the N ring-shaped lens arrays have a central axis. Each of the N ring-shaped lens arrays includes a plurality of lens units. No step difference is between any two adjacent lens units located in the same ring-shaped lens array. In an i-th ring-shaped lens array, the total number of the lens units is related to a location of at least one of the lens units, the total number of the lens units is related to a pitch of the lens units, and i=1 to N.

Based on the above, an embodiment of the invention has at least one of the following advantages or effects. In the near-eye display provided in an embodiment of the invention, a ring-shaped lens array is aligned to the display more easily than a XY lens array is, and the design of no step difference between any two adjacent lens units in the same ring-shaped lens array is not only conducive to improve stray light and the reduction of the amount of incident light due to a decrease in an effective area (or in an effective aperture) of the lens units but also conducive to simplification of manufacturing difficulty. Therefore, in an embodiment of the invention, the near-eye display is characterized by good image quality, easy assembly, a simplified manufacturing process, and the like.

Other objectives, features and advantages provided in one, some, or all of the embodiments of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components provided in the embodiments of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
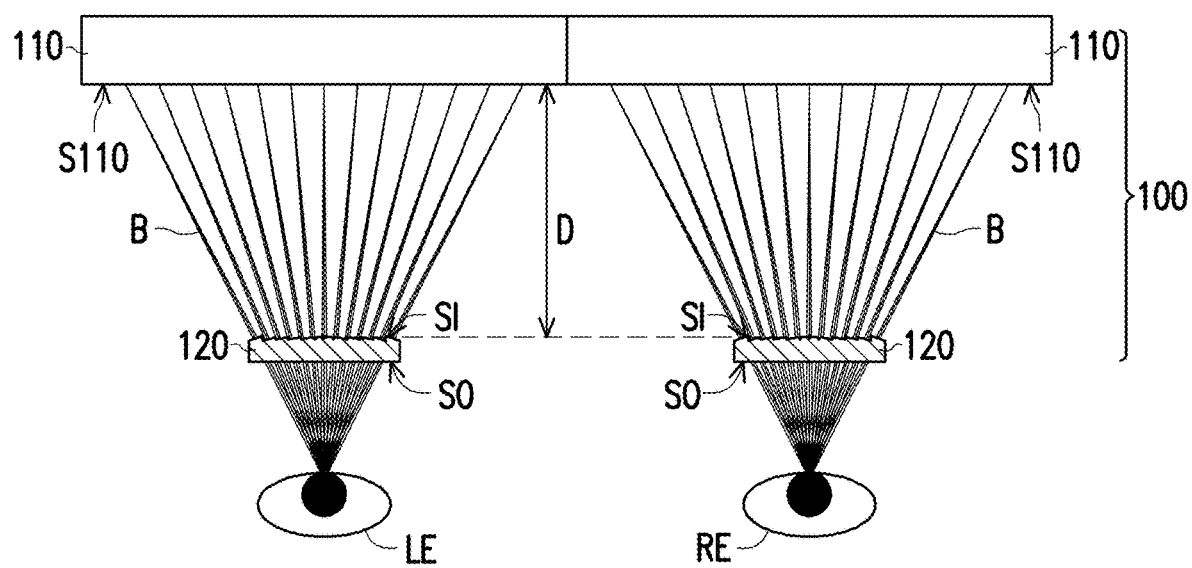
FIG. 1 is a schematic diagram illustrating the relation between a near-eye display and eyes of a user according to an embodiment of the invention.
Figure 2A:
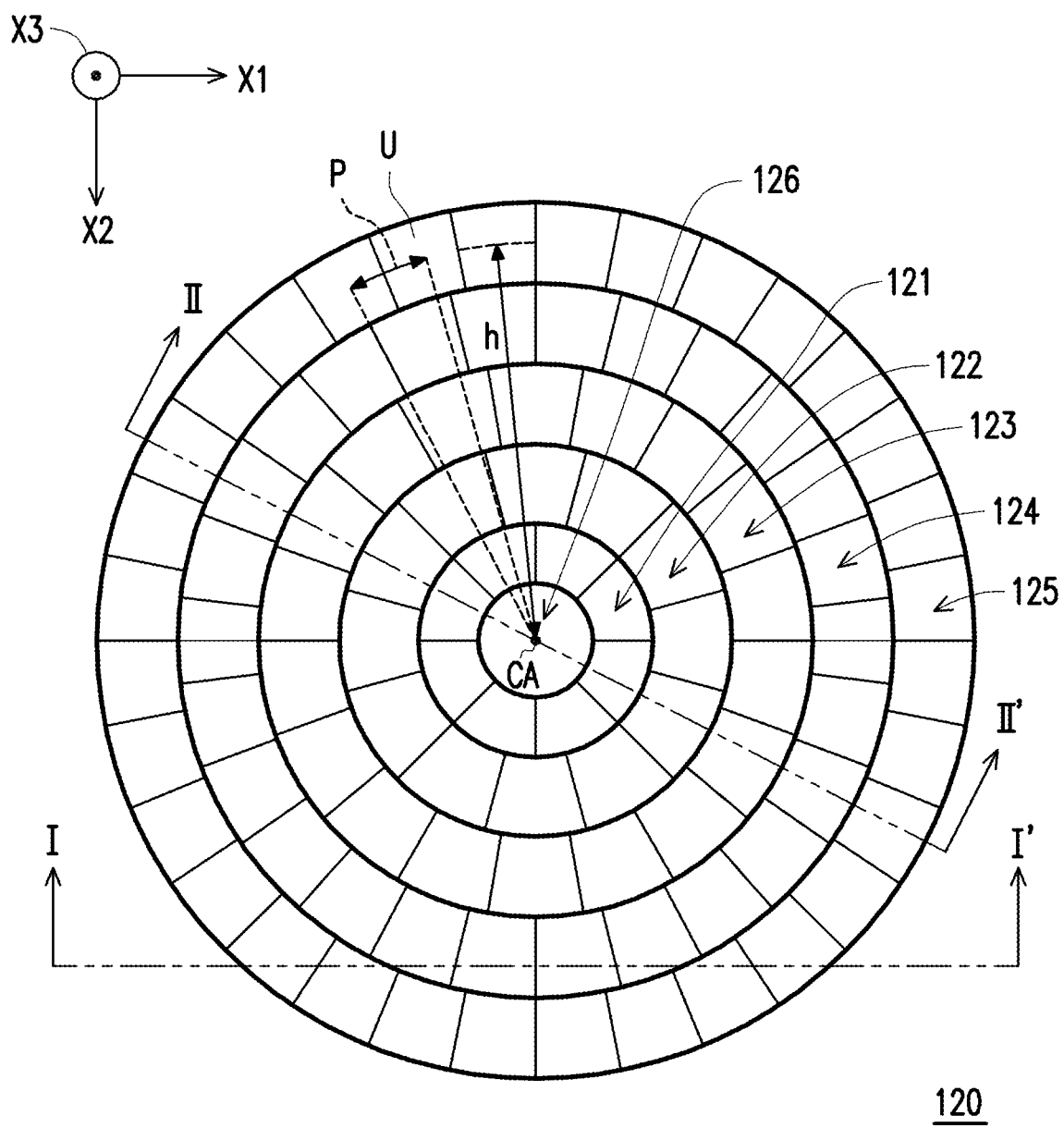
FIG. 2A is a schematic front view of a lens element in a near-eye display according to an embodiment of the invention.
Figure 2B:
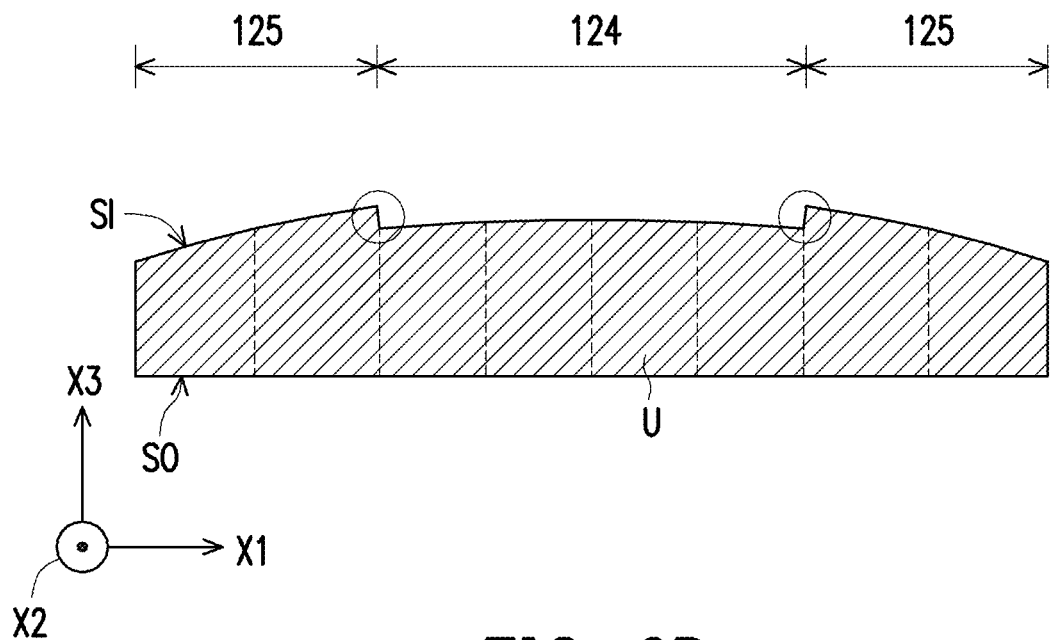
FIG. 2B and FIG. 2C are schematic cross-sectional views taken along section lines I-I' and II-II' in FIG. 2A.
Figure 2C:
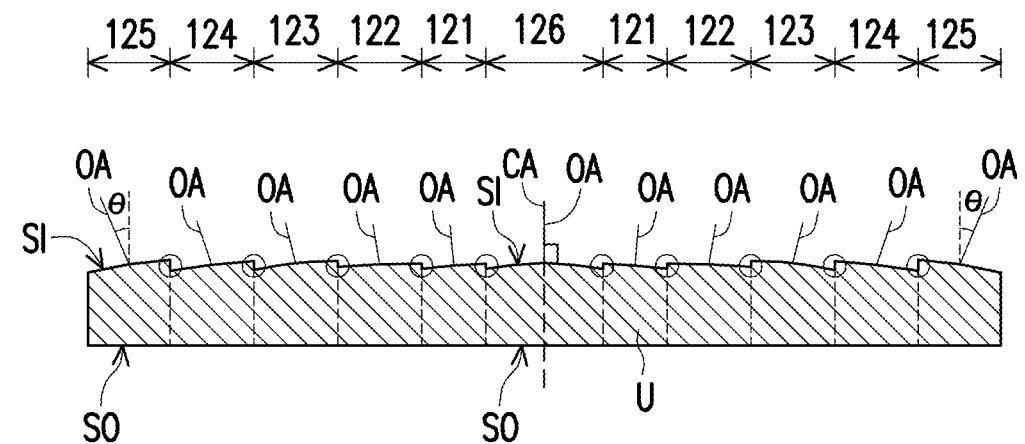

FIG. 1 is a schematic diagram illustrating the relation between a near-eye display and eyes of a user according to an embodiment of the invention. FIG. 2A is a schematic front view of a lens element in a near-eye display according to an embodiment of the invention. FIG. 2B and FIG. 2C are schematic cross-sectional views taken along section lines I-I' and II-II'.

Referring to FIG. 1, in the embodiment, a near-eye display 100 is configured to be worn in front of eyes of a user (e.g., a left eye LE and a right eye RE), and a display beam B is transmitted to the eyes of the user by utilizing a light field technique. In the embodiment, the near-eye display 100 is, for example, a near-eye light field display.

The near-eye display apparatus 100 includes a display 110 and a lens element 120. In the embodiment, the display 110 serves to provide the display beam B, and the display beam B is emitted from a light-exiting surface S110 of the display 110. The display 110 may include any display for providing images, such as an organic light emitting diode display, a liquid crystal on silicon (LCOS) display, a liquid crystal (LCD) display, a micro light emitting diode (Micro LED) display, a light emitting diode (LED) display, or a digital micro-mirror devices (DMD); however, the invention is not limited thereto. In the embodiment, the lens element 120 is located in front of the light-exiting surface S110 of the display 110 and also located on a transmission path of the display beam B. In addition, in the embodiment, a distance D between the lens element 120 and the display 110 is less than an effective focal length of the lens element 120, such that the user is allowed to see an upright and magnified virtual image. In the embodiment, as illustrated in FIG. 1, the distance D is defined as a straight line distance from a center of the lens element 120 to the light-exiting surface S110 of the display 110.

In the embodiment, the near-eye display 100 includes two displays 110 and two lens elements 120, but the invention is not limited thereto. In the embodiment, the two lens elements 120 are respectively located in front of the light-exiting surfaces S110 of the two displays 110, in which the lens element 120 located in front of the left eye LE serves to converge the display beam B provided to the left eye LE to the left eye LE of the user, and the lens element 120 located in front of the right eye RE serves to converge the display beam B provided to the right eye RE to the right eye RE of the user. However, the number of the display 110 and the number of the lens element 120 may vary according to the actual requirement and are not limited to those illustrated in FIG. 1. For example, in another embodiment that is not illustrated in the drawings, the near-eye display 100 may only include one display, and the left half and the right half of the display respectively display a left-eye image and a right-eye image; however, the invention is not limited thereto. Alternatively, in other embodiments that are not illustrated, the near-eye display 100 may also be composed of one display 110 and one lens element 120, but the invention is still not limited thereto.

Referring to FIG. 2A to FIG. 2C, in the embodiment, the lens element 120 includes N ring-shaped lens arrays, wherein N is a positive integer greater than 1. For example, as illustrated in FIG. 2A, in the embodiment, the lens element 120 may include five ring-shaped lens arrays, which are ring-shaped lens arrays 121, 122, 123, 124, and 125, but the number of the ring-shaped lens arrays may vary according to an actual requirement and are not limited to those illustrated in FIG. 2A. In the embodiment, the ring-shaped lens arrays are ring-shaped micro-lens arrays (MLA).

For example, the ring-shaped lens arrays may be circular lens arrays or elliptical lens arrays. FIG. 2A illustrates N (e.g., 5) ring-shaped lens arrays are all, for example, circular lens arrays. However, a shape of the N ring-shaped lens arrays may vary according to the actual requirement and is not limited to those illustrated in FIG. 2A.

The N ring-shaped lens arrays have a central axis CA. Specifically, in the embodiment, the N ring-shaped lens arrays share a central axis (i.e., the central axis CA), and the N ring-shaped lens arrays have, for example, only one central axis (i.e., the central axis CA). Therefore, in the embodiment, all of the N ring-shaped lens arrays surround the central axis CA and are arranged outwardly from the central axis CA. More specifically, in the embodiment, each of the ring-shaped lens arrays surrounds the central axis CA, and a M-th ring-shaped lens array surrounds a (M−1)-th ring-shaped lens array, wherein M=2 to N. In the embodiment, the ring-shaped lens arrays 121, 122, 123, 124, and 125 surround the central axis CA, the ring-shaped lens array 125 surrounds the ring-shaped lens array 124, the ring-shaped lens array 124 surrounds the ring-shaped lens array 123, the ring-shaped lens array 123 surrounds the ring-shaped lens array 122, and the ring-shaped lens array 122 surrounds the ring-shaped lens array 121. In the embodiment, two adjacent ring-shaped lens arrays in the N ring-shaped lens arrays are connected to each other; that is, the ring-shaped lens array 125 is connected to the ring-shaped lens array 124, the ring-shaped lens array 124 is connected between the ring-shaped lens array 125 and the ring-shaped lens array 123, the ring-shaped lens array 123 is connected between the ring-shaped lens array 124 and the ring-shaped lens array 122, and the ring-shaped lens array 122 is connected between the ring-shaped lens array 123 and the ring-shaped lens array 121. In addition, in the embodiment, the lens element 120 further includes a central lens 126. In the embodiment, the central lens 126 is surrounded by the N ring-shaped lens arrays, and the central axis CA of the N ring-shaped lens arrays penetrates a center of the central lens 126. In the embodiment, the central lens 126 is surrounded by the ring-shaped lens arrays 121, 122, 123, 124, and 125, and the central axis CA of the ring-shaped lens arrays 121, 122, 123, 124, and 125 penetrates the center of the central lens 126.

In the embodiment, each ring-shaped lens array (i.e., each of the N ring-shaped lens arrays) includes a plurality of lens units U, and the lens units U of each of ring-shaped lens arrays form a circle around the central axis CA. More specifically, in the embodiment, as illustrated in FIG. 2A, each lens unit U (i.e., each of the plurality of lens units U) is a tetragon composed of two arcs and two straight lines, wherein the two arcs are two minor arcs, for example. In each of the lens units U provided in the embodiment, extension lines of the two straight lines intersect at the central axis CA, such that any of the two straight lines is perpendicular to the two minor arcs. However, a shape of the lens unit U may vary according to a requirement and is not limited to that illustrated in FIG. 2A.

In an i-th ring-shaped lens array provided in the embodiment, the total number of the lens units U is related to a location of at least one of the lens units U, and the total number of the lens units U is related to a pitch of the lens units U, wherein i=1 to N. In the embodiment, the term "position" in the description "the total number of the lens units U is related to a location of at least one of the lens units U" is, for example, a central position of the lens unit U. In the same ring-shaped lens array provided in the embodiment, distances from the lens units U to the central lens 126 are identical, and distances between the lens units U and the central axis CA are also identical. For example, in the embodiment, a distance between a central position of each of the lens units U in the ring-shaped lens array 121 closest to the central lens 126 and the central axis CA is defined as 1 (the unit is omitted), a distance between the central position of each of the lens units U in the ring-shaped lens array 122 second closest to the central lens 126 and the central axis CA is defined as 2, a distance between the central position of each of the lens units U in the ring-shaped lens array 123 third closest to the central lens 126 and the central axis CA is defined as 3, and so forth.

In the embodiment, the total number of the lens units U of each of the ring-shaped lens arrays (i.e., each of the N ring-shaped lens arrays) satisfies equation 1:

$$T = \text{Int}\left(2 \times \pi \times \frac{h}{P}\right) \quad \text{equation 1}$$

In the embodiment, T is the total number of the lens units U in the i-th ring-shaped lens array. In the embodiment, Into is a function rounding a number down to the nearest integer. If the calculated result in the brackets is not an integer, the calculated result may be converted into the nearest integer by the function by rounding down, rounding off, or rounding up. In the embodiment, h is a distance from a central position of any of the lens units U in the i-th ring-shaped lens array to the central axis CA, that is, h is a distance from the central position of any lens unit U in the i-th ring-shaped lens array to the central axis CA, as illustrated in FIG. 2A. In the embodiment, P is a pitch of the lens units U in the i-th ring-shaped lens array. More specifically, in the i-th ring-shaped lens array provided in the embodiment, two central positions of two adjacent lens units U may form a circular arc with respect to the central axis CA as the center, and the length of the circular arc (the arc length) is the pitch P, as illustrated in 2A, which may be designed according to the actual requirement. In the embodiment, as illustrated in 2A, T increases along with the increase in i, and T is the total number of the lens elements U in the i-th ring-shaped lens array. That is to say, in the embodiment, the total number of all lens units U in the ring-shaped lens array is greater if the ring-shaped lens array is farther away from the central lens 126; the total number of all lens units U in the ring-shaped lens array is less if the ring-shaped lens array is closer to the central lens 126. More specifically, in the embodiment, the number of all the lens units U of the ring-shaped lens array 125 farthest from the central lens 126 is the most, the number of all the lens units U of the ring-shaped lens array 121 closest to the central lens 126 is the least, the number of all lens units U in the ring-shaped lens array 124 farther away from the central lens 126 is more than the number of all the lens units U of the ring-shaped lens array 122 closer to the central lens 126, and so forth.

In the embodiment, each ring-shaped lens array (i.e., each of the lens units U of the N ring-shaped lens arrays) has an inner surface SI and an outer surface SO; that is, the ring-shaped lens arrays 121, 122, 123, 124, and 125 have inner surfaces SI and outer surfaces SO. In addition, in the embodiment, the central lens 126 also has the inner surface SI and the outer surface SO. In the embodiment, the inner surface SI faces the display 110, and the outer surface SO is opposite to the inner surface SI and faces the eyes of the user. In the embodiment, the outer surface SO of each of the lens units U and the outer surface SO of the central lens 126 may be a flat surface or a curved surface, and the curved surface may be a spherical surface or an aspheric surface. In addition, in the embodiment, the inner surface SI of each of the lens units U and the inner surface SI of the central lens 126 may be a convex surface, and the convex surface may be a spherical surface or an aspheric surface.

In the embodiment, an equation for the aspheric surface is illustrated as in equation 2 and equation 3:

$$Z = \frac{(1/R) \times \phi^2}{1 + \sqrt{1 - (1-k) \times (\phi/R)^2}} + \quad \text{equation 2}$$

$$A \times \phi^4 + B + \phi^6 + C \times \phi^8 + D \times \phi^{10}$$

$$\phi = \sqrt{x^2 + y^2} \quad \text{equation 3}$$

x, y, and Z are coordinates of the lens element 120 in a x direction X1, in a y direction X2, and in a thickness direction X3, respectively. R is a curvature radius. k is a conic constant. A, B, C and D are aspheric coefficients.

Similar to the lens element in FIG. 2B and FIG. 2C, i.e., the outer surface SO of the lens element is flat, and the inner surface SI of the lens element is convex. Hereafter, one embodiment of relevant parameters of the lens element of the flat outer surface SO and the convex inner surface SI will be exemplified, as shown in Table 1. However, the optical parameters of the lens element provided herein may be determined according to actual demands and are not limited to the parameters shown in Table 1.

TABLE 1

| | outer surface | | inner surface | | | | | |
| --- | --- | --- | --- | --- | --- | --- | --- | --- |
| | R | k | R | k | A | B | C | θ(°) |
| central lens | ∞ | 0 | −2.396 | 9.062 | 0.12 | −0.035 | 0.394 | 0 |
| lens units of the first ring | ∞ | 0 | −2.396 | 9.062 | 0.12 | −0.035 | 0.394 | 2.262 |
| lens units of the second ring | ∞ | 0 | −2.396 | 9.062 | 0.12 | −0.035 | 0.394 | 4.272 |
| lens units of the third ring | ∞ | 0 | −2.396 | 9.062 | 0.12 | −0.035 | 0.394 | 6.474 |
| lens units of the fourth ring | ∞ | 0 | −2.396 | 9.062 | 0.12 | −0.035 | 0.394 | 9.04 |
| lens units of the fifth ring | ∞ | 0 | −2.396 | 9.062 | 0.12 | −0.035 | 0.394 | 14.035 |
| lens unit of the sixth ring | ∞ | 0 | −2.396 | 9.062 | 0.12 | −0.035 | 0.394 | 18.745 |
| lens units of the seventh ring | ∞ | 0 | −2.396 | 9.062 | 0.12 | −0.035 | 0.394 | 23.129 |

According to the embodiment shown in Table 1, the number of the ring-shaped lens arrays of the lens element is, for example, 7, wherein the first ring-shaped lens array to the seventh ring-shaped lens array are arranged outwardly from the central lens 126. That is, in the embodiment, the first ring-shaped lens array is the closest to the central lens 126, while the seventh ring-shaped lens array is the farthest from the central lens 126. In Table 1, the lens units of the first ring refer to the lens units U of the first ring-shaped lens array, the lens units of the second ring refer to the lens units U of the second ring-shaped lens array, and so forth. In addition, in the embodiment, the aspheric coefficients A, B, C, D and tilt angles θ (to be described hereinafter) of the outer surface SO of the central lens 126 and the lens units U of the first ring to the lens units U of the seventh ring are 0. The aspheric coefficients D of the inner surface SI of the central lens 126 and the lens units U of the first ring to the seventh ring is 0, which is thus omitted. In the embodiment, the curvature radius R of the outer surface SO being infinity (∞) indicates that the outer surface SO is a flat surface. In the embodiment, θ refers to a tilt angle of an optical axis (which will be described hereinafter) of the lens unit U.

In an embodiment depicted in FIG. 2C, each lens unit U (i.e., each of the plurality of lens units U) and the central lens 126 have an optical axis OA, the optical axis OA of the central lens 126 passes through a center of the inner surface SI of the central lens 126, and the optical axis OA of the central lens 126 is perpendicular to a tangent plane of the center of the inner surface SI. In the embodiment depicted in FIG. 2C, the optical axis OA of the central lens 126 is parallel to and overlaps with the central axis CA, and the optical axis OA of each lens unit U (i.e., each of the plurality of lens units U) tilts in a direction away from the central axis CA. In the same ring-shaped lens array provided in the embodiment of the invention, a tilt angle θ of the optical axis OA of each lens unit U (i.e., each of the plurality of lens units U) is identical. On the other hand, in different ring-shaped lens arrays provided in the embodiment of the invention, if the distance from the lens units U to the central axis CA increases, the tilt angles θ of the optical axes OA of the lens units U increase, as shown in Table 1. In the embodiment, a tilt angle θ of an optical axis OA of an inner surface SI of a lens unit U of an outer ring is greater than that of an inner ring; that is, a tilt angle θ of an optical axis OA of an inner surface SI of a lens unit U of the seventh ring is greater than that of the sixth ring, the tilt angle θ of the optical axis OA of the inner surface SI of the lens unit U of the sixth ring is greater than that of the fifth ring, and the rest can be deduced therefrom.

Due to the above design of the tilt angle θ, the off-axis display beams may be effectively concentrated, such that the edge of the generated virtual image is more clear, which leads to a complete virtual image with the improved image quality.

However, if a conventional XY lens array adopts the above design in which the tilt angle θ increases outwardly (i.e., the design in which the tilt angle θ of the optical axis OA increases if the distance from the lens units U to the central axis CA increases), a step difference (height difference) exists between each of the lens units and the adjacent lens unit in an X direction, and a step difference also exists between each of the lens units and the adjacent lens units in a Y direction. The step difference is usually generated on the condition of a small tilt angle and an R angle during processing, which may lead to the reduction of the amount of incident light due to stray light and the reduction of an effective area of the lens units. As such, the image quality may decrease.

In comparison, in the embodiment, the outer surfaces SO of the lens units U of the N ring-shaped lens arrays and the outer surface SO of the central lens 126 may commonly form a flat surface or a curved surface without step difference. In addition, in the embodiment, there is no step difference between the inner surfaces SI of the lens units U of the N ring-shaped lens arrays and the inner surface SI of the central lens 126 in a circumferential direction of the lens element 120, but there is a step difference between the inner surfaces SI of the lens units U of the N ring-shaped lens arrays in a radial direction of the lens element 120. In other words, in the embodiment, there is no step difference between any two adjacent lens units U located in the same ring-shaped lens array (i.e., any two adjacent lens units U), and there is a step difference between any two adjacent lens units U located in different ring-shaped lens arrays (i.e., any two adjacent lens units U). As illustrated in FIG. 2B, in the embodiment, there is no step difference between any two adjacent lens units U in the ring-shaped lens array 124; that is, there is no height difference between any two adjacent lens units U (no difference in thickness of two adjacent lens units U at a junction). Similarly, no step difference exists between any two adjacent lens units U in the ring-shaped lens array 125. That is, there is no step difference between any two adjacent lens units U in the ring-shaped lens array 125. On the other hand, as illustrated by circular marks in FIG. 2B and FIG. 2C, the height difference exists between any two adjacent lens units U in different lens arrays provided in the embodiment.

Further, when the conventional XY lens array and the display are aligned to each other, the alignment relationship between the four sides of the XY lens array and the four sides of the display/the display image should be taken into consideration, and issues regarding complexity and accuracy of the alignment are still to be addressed. By contrast, according to this embodiment, the ring-shaped layout of the ring-shaped lens array is simplified compared to the four-side layout of the XY lens array. Therefore, in the embodiment, with the design of the ring-shaped lens array, the alignment difficulty and complexity of the lens element 120 and the display 110 may be lowered, and there exists no step difference between any two adjacent lens units U located in the same ring-shaped lens array; that is, no step difference is between any two adjacent lens units U in a circumferential direction of the lens element 120. As such, problems of the stray light in the circumferential direction of the lens element 120 may be solved, issues of the decrease in the amount of the incident light (the display beam provided by the display) and the reduced brightness resulting from of the reduced effective area (or the reduced effective aperture) of the lens units may be solved, and difficulty in the manufacturing process may also be reduced. Therefore, the near-eye display 100 provided in the embodiment of the invention has advantages of good image quality, easy assembly, the simplified manufacturing process, and so on.

Figure 3A:
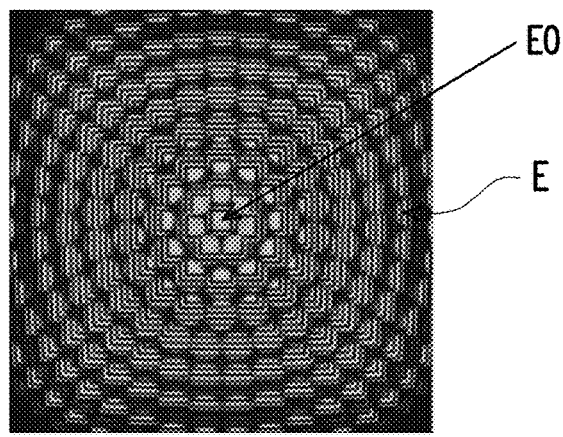
FIG. 3A is a schematic view of a plurality of elemental images displayed by a near-eye display according to an embodiment of the invention.
Figure 3B:
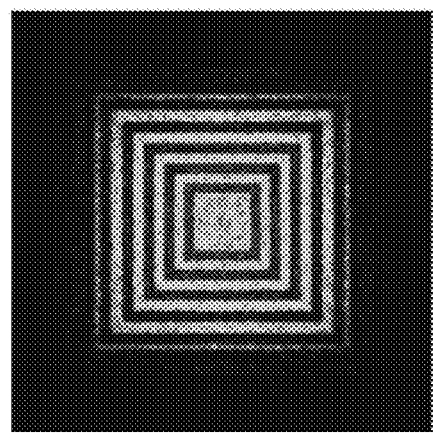
FIG. 3B is a virtual image generated by a near-eye display according to an embodiment of the invention.
Figure 4:
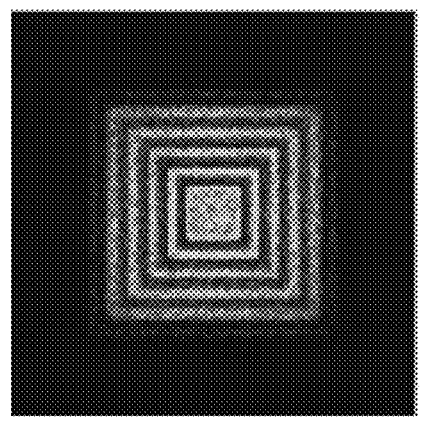
FIG. 4 is a virtual image generated by a near-eye display according to a comparative example.

FIG. 3A is a schematic view of a plurality of elemental images displayed by a near-eye display according to an embodiment of the invention, wherein the elemental images E displayed by the display 110 form a ring-shaped array around the central elemental image E0. FIG. 3B is a virtual image generated by a near-eye display according to an embodiment of the invention. FIG. 4 is a virtual image generated by a near-eye display according to a comparative example, wherein FIG. 4 is the virtual image generated by a near-eye display adopting the design of the XY lens array but not adopting the design of the tilt angle. It can be learned through the result of comparing FIG. 3B and FIG. 4 that the overall clarity of the image in FIG. 3B is greater, and the edges of the image in FIG. 3B are also clearer. In view of the above, the edges of the virtual image may be clearer/more distinct due to the design in which the tilt angle θ increases outwardly (i.e., the design in which the tilt angle θ of the optical axis OA increases if the distance from the lens units U to the central axis CA increases according to the previous embodiment), and thereby the overall image quality of the virtual image is favorable. In addition, the contrast of the virtual image may be significantly enhanced if the ring-shaped lens array is used, which ensures that no step difference exists in the circumferential direction of the lens element.

Figure 5:
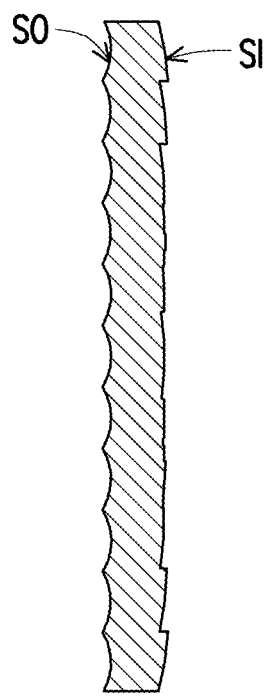
FIG. 5 is a cross-sectional view of a lens element of a near-eye display according to another embodiment of the invention.
Figure 6:
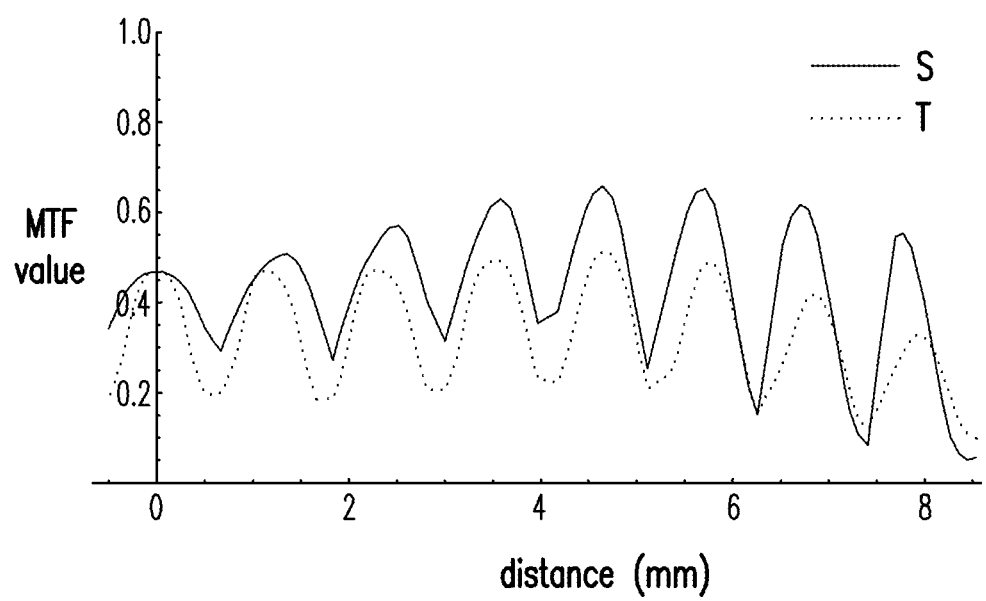
FIG. 6 is a modulation transfer function (MTF) curve diagram generated by the lens element of the near-eye display depicted in FIG. 5.
Figure 7:
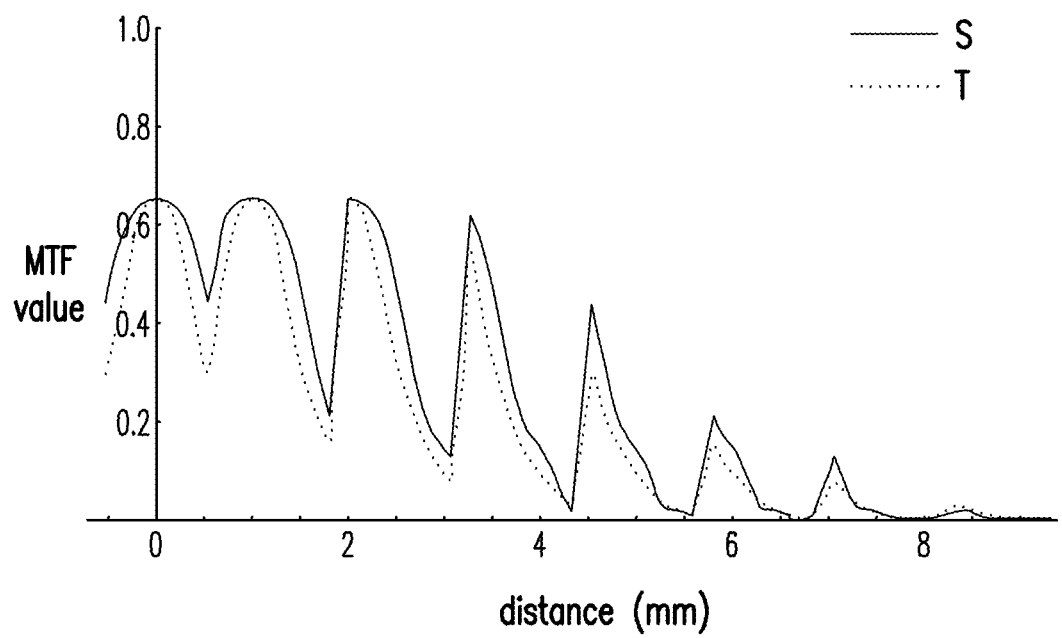
FIG. 7 is a MTF curve diagram generated by a near-eye display according to a comparative example.
Figure 8:
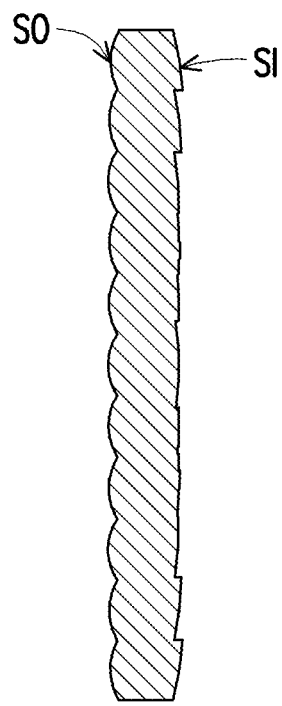
FIG. 8 is a cross-sectional view of a lens element of a near-eye display according to another embodiment of the invention.
Figure 9:
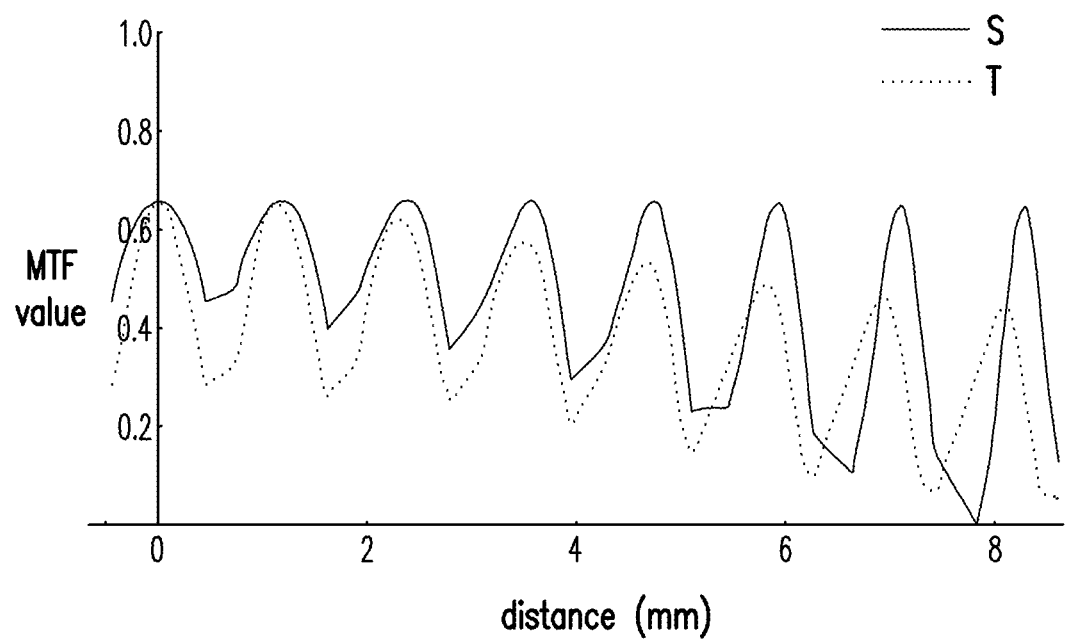
FIG. 9 is a MTF curve diagram generated by the lens element of the near-eye display depicted in FIG. 8.
Figure 10:
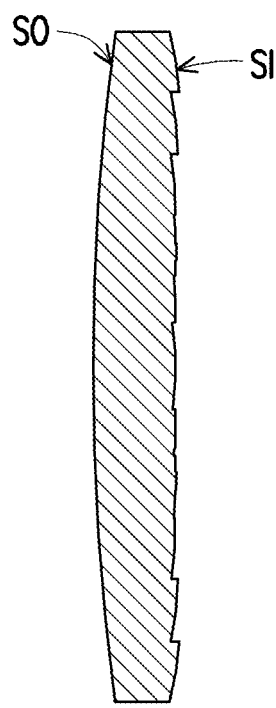
FIG. 10 is a cross-sectional view of a lens element of a near-eye display according to another embodiment of the invention.
Figure 11:
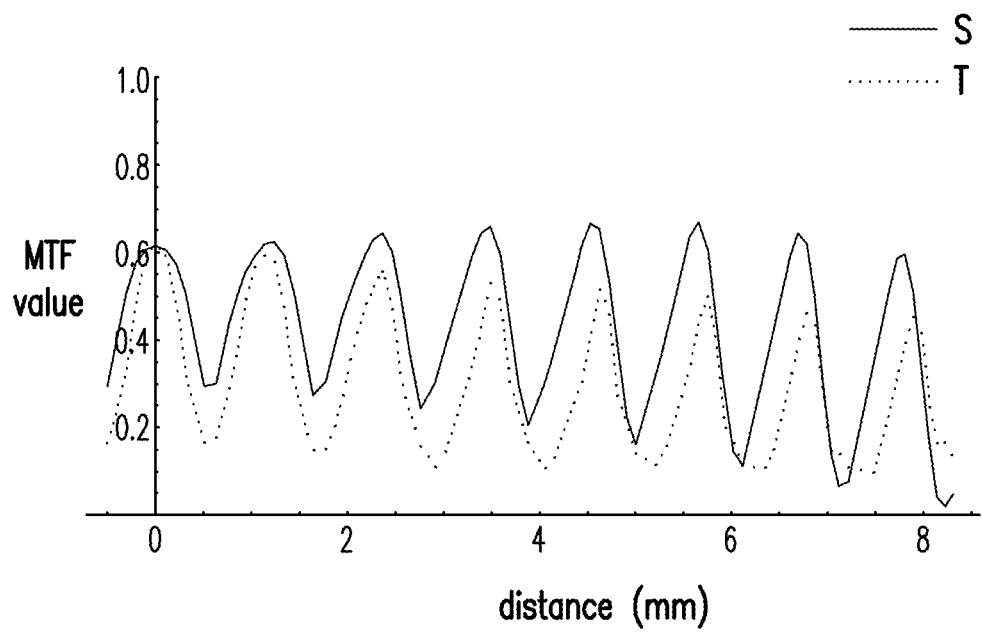
FIG. 11 is a MTF curve diagram generated by the lens element of the near-eye display depicted in FIG. 10.
Figure 12:
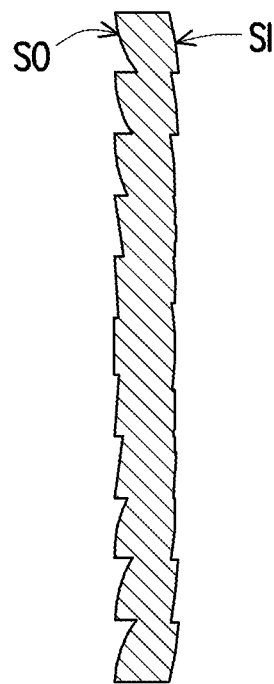
FIG. 12 is a cross-sectional view of a lens element of a near-eye display according to another embodiment of the invention.
Figure 13:
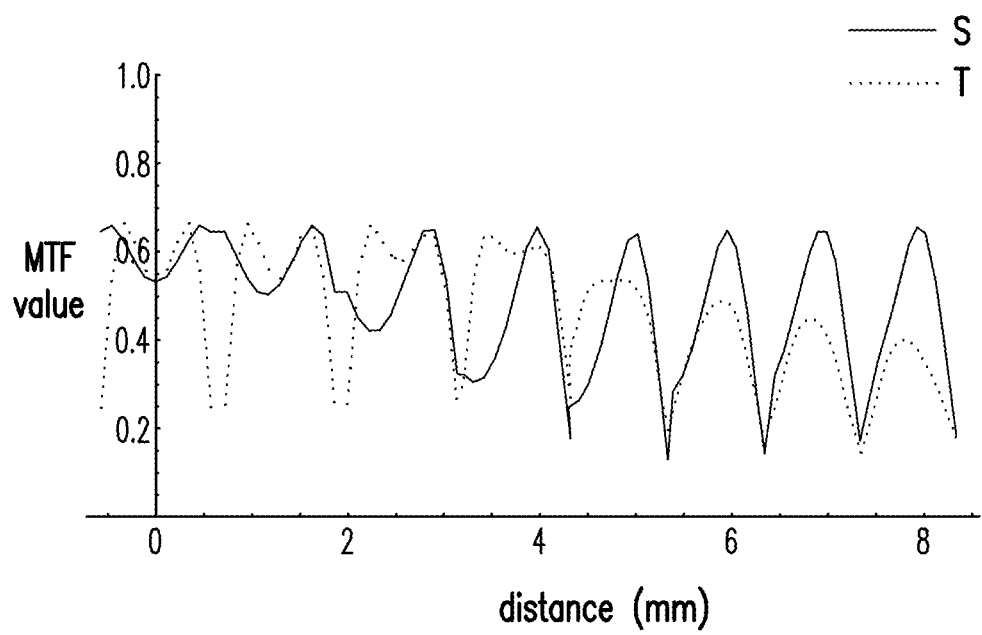
FIG. 13 is a MTF curve diagram generated by the lens element of the near-eye display depicted in FIG. 12.

Other embodiments and effects of the lens element of the near-eye display will be described hereinafter with reference to FIG. 5 to FIG. 13. FIG. 5 is a cross-sectional view of a lens element of a near-eye display according to another embodiment of the invention. FIG. 6 is a modulation transfer function (MTF) curve diagram generated by the lens element of the near-eye display depicted in FIG. 5. FIG. 7 is a MTF curve diagram generated by a near-eye display according to a comparative example, wherein FIG. 7 is the MTF curve diagram generated by the near-eye display depicted in FIG. 4 (i.e., the near-eye display provided in the comparative example). FIG. 8 is a cross-sectional view of a lens element of a near-eye display according to another embodiment of the invention. FIG. 9 is a MTF curve diagram generated by the lens element of the near-eye display depicted in FIG. 8. FIG. 10 is a cross-sectional view of a lens element of a near-eye display according to another embodiment of the invention. FIG. 11 is a MTF curve diagram generated by the lens element of the near-eye display depicted in FIG. 10. FIG. 12 is a cross-sectional view of a lens element of a near-eye display according to another embodiment of the invention. FIG. 13 is a MTF curve diagram generated by the lens element of the near-eye display depicted in FIG. 12. FIG. 6, FIG. 7, FIG. 9, FIG. 11 and FIG. 13 illustrate MTF curves of elemental images at different positions at the spatial frequency of 64 line pair/mm (lp/mm), wherein the x-coordinate is the distance from the elemental images E to the central elemental image E0, and the y-coordinate is the MTF value at 64 lp/mm. A curve S and a curve T are MTF curves in a sagittal direction and a tangential direction, respectively.

The lens element provided in the embodiments as shown in FIG. 5, FIG. 8, FIG. 10, and FIG. 12 is similar to the lens element provided in the embodiment as shown in FIG. 2. The main difference between the lens elements provided in these embodiments and in the embodiment shown in FIG. 2 lies in the optical parameter design of the central lens 126 and the two surfaces (the outer surface SO and the inner surface SI) of the lens units U of each ring. Please refer to Table 2 for the optical parameter design provided in the embodiment as shown in FIG. 5. Please refer to Table 3 for the optical parameter design provided in the embodiment as shown in FIG. 8. Please refer to Table 4-1 and Table 4-2 for the optical parameter design provided in the embodiment as shown in FIG. 10. Please refer to Table 5-1 and Table 5-2 for the optical parameter design provided in the embodiment as shown in FIG. 12.

In the comparative example shown in FIG. 7, the MTF values in a sagittal direction and a tangential direction decrease together with the increase in the distance between the elemental images E and the central elemental image E0, which indicates that the off-axis display beams cannot be concentrated and thus leads to the obscure edges of the virtual image. In comparison, as provided in the embodiments as shown in FIG. 6, FIG. 9, FIG. 11, and FIG. 13, the MTF values in the sagittal direction and the tangential direction may be effectively enhanced by a design in which the tilt angle θ increases outwardly (i.e., the design in which the tilt angle θ of the optical axis OA increases if the distance from the lens units U to the central axis CA increases). This indicates that the conventional problem of the off-axis display beams which are not able to be concentrated is effectively solved, thus resulting in clear edges of the virtual image, as illustrated in FIG. 3B.

TABLE 2

| | outer surface | | inner surface | | | | | |
|---|---|---|---|---|---|---|---|---|
| | R | k | R | k | A | B | C | θ(°) |
| central lens | −44.396 | −10 | −2.256 | 10 | 0.161 | −0.134 | 0.902 | 0 |
| lens units of the first ring | −44.396 | −10 | −2.256 | 10 | 0.161 | −0.134 | 0.902 | 2.134 |
| lens units of the second ring | −44.396 | −10 | −2.256 | 10 | 0.161 | −0.134 | 0.902 | 4.103 |

TABLE 2-continued

| | outer surface | | inner surface | | | | | |
|---|---|---|---|---|---|---|---|---|
| | R | k | R | k | A | B | C | θ(°) |
| lens units of the third ring | −44.396 | −10 | −2.256 | 10 | 0.161 | −0.134 | 0.902 | 6.033 |
| lens units of the fourth ring | −44.396 | −10 | −2.256 | 10 | 0.161 | −0.134 | 0.902 | 7.813 |
| lens units of the fifth ring | −44.396 | −10 | −2.256 | 10 | 0.161 | −0.134 | 0.902 | 9.465 |
| lens unit of the sixth ring | −44.396 | −10 | −2.256 | 10 | 0.161 | −0.134 | 0.902 | 10.993 |
| lens units of the seventh ring | −44.396 | −10 | −2.256 | 10 | 0.161 | −0.134 | 0.902 | 12.447 |

As shown in Table 2 and FIG. 5, in the embodiment, the outer surface SO of the lens element is concave, and the inner surface SI of the lens element is convex, wherein the outer surface of each of the lens units is concave (i.e., the outer surfaces SO of the plurality of lens units are concave surfaces). In the embodiment, a tilt angle θ of an optical axis of the inner surface SI of a lens unit of an outer ring is greater than that of an inner ring. That is, the tilt angle θ of the optical axis of the inner surface SI of the lens unit of the seventh ring is greater than that of the sixth ring, and so forth. In addition, in the embodiment, the aspheric coefficients A, B, C, and D and the tilt angles θ of the lens units of the first ring to the seventh ring and the outer surface SO of the central lens are 0, the aspheric coefficients D of the lens units of the first ring to the lens units of the seventh ring and the inner surface SI of the central lens are 0, and therefore are omitted.

TABLE 3

| | outer surface | | inner surface | | | | | |
|---|---|---|---|---|---|---|---|---|
| | R | k | R | k | A | B | C | θ(°) |
| central lens | 13.133 | 10 | −2.907 | −10 | −0.053 | 0.153 | −0.285 | 0 |
| lens units of the first ring | 13.133 | 10 | −2.916 | 4.515 | 0.019 | 0.131 | −0.234 | 2.061 |
| lens units of the second ring | 13.133 | 10 | −2.923 | 2.093 | 0.015 | 0.063 | −0.11 | 4.231 |
| lens units of the third ring | 13.133 | 10 | −2.941 | 2.294 | 0.021 | 0.023 | −0.027 | 6.291 |
| lens units of the fourth ring | 13.133 | 10 | −2.97 | 1.727 | 0.021 | −0.01 | 0.038 | 8.141 |
| lens units of the fifth ring | 13.133 | 10 | −3.008 | 1.881 | 0.023 | −0.034 | 0.088 | 9.727 |
| lens unit of the sixth ring | 13.133 | 10 | −3.057 | 4.971 | 0.035 | −0.042 | 0.121 | 11.042 |
| lens units of the seventh ring | 13.133 | 10 | −3.115 | 4.761 | 0.032 | −0.048 | 0.129 | 12.196 |

As illustrated in Table 3 and FIG. 8, in the embodiment, the outer surface SO of the lens element is convex, and the inner surface SI of the lens element is convex, wherein the outer surface of each of the lens units is convex (i.e., the outer surfaces SO of the plurality of lens units are convex surfaces). In the embodiment, a tilt angle θ of an optical axis of an inner surface SI of a lens unit of an outer ring is greater than that of an inner ring. That is, the tilt angle θ of the optical axis of the inner surface SI of the lens unit of the seventh ring is greater than that of the optical axis of the inner surface SI of the lens unit of the sixth ring, and so forth. In addition, in the embodiment, the aspheric coefficients A, B, C, and D and tilt angles θ of the lens units of the first ring to the seventh ring and the outer surface SO of the central lens are 0, the aspheric coefficients D of the lens units of the first ring to the seventh ring and the inner surface SI of the central lens are 0, and are thus omitted.

TABLE 4-1

| | outer surface | | | | | |
|---|---|---|---|---|---|---|
| | R | k | A | B | C | D |
| central lens | 65.998 | −20 | −3.7E−5 | 3.27E−7 | 1.49E−9 | −3.81E−11 |
| lens units of the first ring | 65.998 | −20 | −3.7E−5 | 3.27E−7 | 1.49E−9 | −3.81E−11 |
| lens units of the second ring | 65.998 | −20 | −3.7E−5 | 3.27E−7 | 1.49E−9 | −3.81E−11 |
| lens units of the third ring | 65.998 | −20 | −3.7E−5 | 3.27E−7 | 1.49E−9 | −3.81E−11 |
| lens units of the fourth ring | 65.998 | −20 | −3.7E−5 | 3.27E−7 | 1.49E−9 | −3.81E−11 |
| lens units of the fifth ring | 65.998 | −20 | −3.7E−5 | 3.27E−7 | 1.49E−9 | −3.81E−11 |
| lens units of the sixth ring | 65.998 | −20 | −3.7E−5 | 3.27E−7 | 1.49E−9 | −3.81E−11 |
| lens units of the seventh ring | 65.998 | −20 | −3.7E−5 | 3.27E−7 | 1.49E−9 | −3.81E−11 |

TABLE 4-2 inner surface

| | R | k | A | B | C | θ(°) |
|---|---|---|---|---|---|---|
| central lens | −2.448 | 10.45 | 0.117 | 0.0313 | 0.33 | 0 |
| lens units of the first ring | −2.448 | 10.45 | 0.117 | 0.0313 | 0.33 | 2.024 |
| lens units of the second ring | −2.448 | 10.45 | 0.117 | 0.0313 | 0.33 | 4.034 |
| lens units of the third ring | −2.448 | 10.45 | 0.117 | 0.0313 | 0.33 | 6.00027 |
| lens units of the fourth ring | −2.448 | 10.45 | 0.117 | 0.0313 | 0.33 | 7.901 |
| lens units of the fifth ring | −2.448 | 10.45 | 0.117 | 0.0313 | 0.33 | 9.734 |
| lens unit of the sixth ring | −2.448 | 10.45 | 0.117 | 0.0313 | 0.33 | 11.558 |
| lens units of the seventh ring | −2.448 | 10.45 | 0.117 | 0.0313 | 0.33 | 13.433 |

As illustrated in Table 4-1, Table 4-2, and FIG. 10, in the embodiment, the outer surface SO of the lens element is convex, and the inner surface SI of the lens element is convex, wherein the outer surfaces SO of a plurality of (all of) the lens units form a convex. In the embodiment, a tilt angle θ of an optical axis of an inner surface SI of a lens unit of an outer ring is greater than that of an inner ring. That is, the tilt angle θ of the optical axis of the inner surface SI of the lens unit of the seventh ring is greater than that of the sixth ring, and so forth. In addition, in the embodiment, the tilt angles θ of the lens units of the first ring to the seventh ring and the outer surface SO of the central lens are 0, the aspheric coefficients D of the lens units of the first ring to the seventh ring and the inner surface SI of the central lens are 0, and are thus omitted.

TABLE 5-1 outer surface

| | R | k | θ(°) |
|---|---|---|---|
| central lens | 2.905 | −0.6 | 0 |
| lens units of the first ring | 2.9 | −0.4 | 4.354 |
| lens units of the second ring | 2.961 | −0.3 | 8.366 |
| lens units of the third ring | 3.32 | 0.3 | 10.649 |
| lens units of the fourth ring | 6.498 | 7.3 | 8.14 |
| lens units of the fifth ring | 30.958 | −20 | 3.446 |
| lens units of the sixth ring | 151.424 | −20 | −0.506 |
| lens units of the seventh ring | 596.948 | −20 | −3.772 |

TABLE 5-2 inner surface

| | R | k | A | B | C | θ(°) |
|---|---|---|---|---|---|---|
| central lens | −36.904 | −20 | 0.01 | −0.08 | 0.196 | 0 |
| lens units of the first ring | −40.143 | −16.969 | 0.005 | −0.02 | 0.047 | 4.763 |
| lens units of the second ring | −31.17 | 20 | 0.0143 | −0.078 | 0.161 | 9.459 |
| lens units of the third ring | −12.944 | 20 | 0.0285 | −0.119 | 0.214 | 13.586 |
| lens units of the fourth ring | −3.925 | 19.996 | 0.101 | −0.21 | 0.438 | 13.697 |
| lens units of the fifth ring | −2.586 | −0.893 | 0.061 | −0.257 | 0.43 | 11.836 |
| lens units of the sixth ring | −2.427 | −6.369 | 0.007 | −0.205 | 0.369 | 11.798 |
| lens units of the seventh ring | −2.403 | −1.95 | 0.039 | −0.188 | 0.311 | 12.227 |

As illustrated in Table 5-1, Table 5-2, and FIG. 12, in the embodiment, the outer surface SO of the lens element is convex, and the inner surface SI of the lens element is convex, wherein the outer surface of each of the lens units is convex (i.e., the outer surfaces SO of the plurality of lens units are convex surfaces). In the embodiment, the outer surface SO and the inner surface SI of the lens units of each ring has a tilt angle θ. In addition, in the embodiment, the tilt angles θ of the lens units of the first ring to the seventh ring and the outer surface SO of the central lens are 0, the aspheric coefficients D of the lens units of the first ring to the seventh ring and the inner surface SI of the central lens are 0, and are thus omitted.

Some curved surfaces in the above embodiment are, for example, aspheric lens, but the invention is not limited thereto. For example, in other embodiments, the curved surfaces may also be freeform curved surfaces which satisfy the following equations:

$$Z = \frac{(1/R) \times \phi^2}{1 + \sqrt{1 - (1-k) \times (\phi/R)^2}} + \sum_{\substack{n=0,1,2,\ldots \\ m=0,1,2,\ldots}} a_{nm} x^n y^m \quad \text{equation 4}$$

$$\phi = \sqrt{x^2 + y^2}, \quad \text{equation 3}$$

wherein $a_{nm}$ is a coefficient of the freeform curved surface. However, the curved surface provided in the invention is not limited to the freeform curved surface.

To sum up, the embodiments of the invention have at least one of the following advantages or effects. In the near-eye display device provided in an embodiment of the invention, the ring-shaped lens array, compared to the XY lens array, may be aligned to the display more easily, and with a design in which no step difference exists between any two adjacent lens units U located in the same ring-shaped lens array (i.e., any two adjacent lens units U), the problems of stray light and the reduced amount of incident light due to the reduced effective area (or the reduced effective aperture) of the lens units may be solved, and difficulty in the manufacturing process may also be reduced. Therefore, one or more embodiments of invention have advantages of good image quality, easy assembly, the simplified manufacturing process, and so on. In one embodiment, the design in which the tilt angle θ increases outwardly (i.e., the design in which the tilt angle θ of the optical axis OA increases if the distance from the lens units U to the central axis CA increases) may be further adopted, such that the off-axis display beams may be effectively concentrated, and that the edges of the virtual image may be clearer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A near-eye display apparatus, comprising
a display, having a light-exiting surface; and
a lens element, located in front of the light-exiting surface of the display, the lens element comprising N ring-shaped lens arrays, wherein N is a positive integer greater than 1, and the N ring-shaped lens arrays have a central axis, each of the N ring-shaped lens arrays comprising a plurality of lens units,
wherein no step difference exists between any two adjacent lens units of the plurality of lens units in a same ring-shaped lens array of the N ring-shaped lens arrays,
wherein in an i-th ring-shaped lens array of the N ring-shaped lens arrays a total number of the plurality of lens units is related to a location of at least one of the plurality of lens units, the total number of the plurality of lens units is related to a pitch of the plurality of lens units, and i=1 to N.

2. The near-eye display apparatus of claim 1, wherein each of the N ring-shaped lens arrays satisfies:

$$T = \text{Int}\left(2 \times \pi \times \frac{h}{P}\right),$$

wherein T is the total number of the plurality of lens units in the i-th ring-shaped lens array;
Int( ) is a function rounding a number down to a nearest integer;
h is a distance from a central position of one of the plurality of lens units in the i-th ring-shaped lens array to the central axis; and
P is the pitch of the plurality of lens units in the i-th ring-shaped lens array.

3. The near-eye display apparatus of claim 2, wherein T increases together with an increase in i.

4. The near-eye display apparatus of claim 1, wherein each of the plurality of lens units has an optical axis, each of the optical axes of the plurality of lens units tilts in a direction away from the central axis, and a tilt angle of the optical axis of each of the plurality of lens units located in the same ring-shaped lens array are identical, wherein the tilt angle of the optical axis of the each of the plurality of lens units increases if a distance between the each of the plurality of lens units and the central axis increases.

5. The near-eye display apparatus of claim 1, wherein each of the plurality of lens units of the N ring-shaped lens arrays has an inner surface facing the display and an outer surface opposite to the inner surface, wherein the outer surfaces of the plurality of lens units of the N ring-shaped lens arrays together constitute a curved surface without the step difference, no step difference exists among the inner surfaces of the plurality of lens units of the N ring-shaped lens arrays in a circumferential direction of the lens element, and the step difference exists among the inner surfaces of the plurality of lens units of the N ring-shaped lens arrays in a radial direction of the lens element.

6. The near-eye display apparatus of claim 1, wherein each of the plurality of lens units of the N ring-shaped lens arrays has an inner surface facing the display and an outer surface opposite to the inner surface, and the inner surfaces and the outer surfaces are aspheric.

7. The near-eye display apparatus of claim 1, wherein each of the plurality of lens units of the N ring-shaped lens arrays is a tetragon, and the tetragon is composed of two minor arcs and two straight lines.

8. The near-eye display apparatus of claim 1, wherein the lens element comprises a central lens surrounded by the N ring-shaped lens arrays, wherein the central axis penetrates a center of the central lens, and an optical axis of the central lens is parallel to the central axis.

9. The near-eye display apparatus of claim 1, wherein the display comprises an organic light emitting diode display, a liquid crystal on silicon display, a liquid crystal display, a micro light emitting diode display, a light emitting diode display, or a digital micro-mirror display.

10. The near-eye display apparatus of claim 1, wherein a distance from the lens element to the display is less than an effective focal length of the lens element.

\* \* \* \* \*